United States Patent
Kames

(10) Patent No.: US 6,589,321 B2
(45) Date of Patent: Jul. 8, 2003

(54) FILTER MATERIAL USEFUL FOR GAS FILTRATION AND HAVING BIOCIDAL PROPERTIES

(75) Inventor: Jost Kames, Haan (DE)

(73) Assignee: Jost Kames, Duernten (CH)

( * ) Notice: Subject to any disclaimer, the term of this patent is extended or adjusted under 35 U.S.C. 154(b) by 0 days.

(21) Appl. No.: 10/038,780

(22) Filed: Jan. 8, 2002

(65) Prior Publication Data

US 2002/0096051 A1 Jul. 25, 2002

Related U.S. Application Data

(63) Continuation of application No. PCT/EP00/06382, filed on Jul. 6, 2000.

(30) Foreign Application Priority Data

Jul. 8, 1999 (DE) .......................................... 199 31 371

(51) Int. Cl.$^7$ ................................................ B01D 53/04
(52) U.S. Cl. ............................. 96/153; 96/154; 96/226; 55/524; 55/DIG. 42; 422/122
(58) Field of Search ......................... 96/153, 154, 223, 96/226, 227; 55/524, DIG. 42; 422/120, 122

(56) References Cited

U.S. PATENT DOCUMENTS

| | | | | |
|---|---|---|---|---|
| 4,604,110 A | | 8/1986 | Frazier | |
| 5,288,298 A | * | 2/1994 | Aston | 55/485 |
| 5,478,377 A | * | 12/1995 | Scavnicky et al. | 128/206.17 |
| 5,529,609 A | * | 6/1996 | Gooch et al. | 55/518 |
| 5,639,452 A | | 6/1997 | Messier | |
| 5,662,728 A | * | 9/1997 | Groeger | 428/323 |
| 5,871,569 A | * | 2/1999 | Oehler et al. | 210/502.1 |
| 5,874,052 A | * | 2/1999 | Holland | 422/122 |
| 5,980,827 A | | 11/1999 | Messier | |
| 6,045,820 A | | 4/2000 | Messier | |
| 6,190,437 B1 | * | 2/2001 | Forsyth | 210/501 |
| 6,402,819 B1 | * | 6/2002 | De Ruiter et al. | 96/153 |

FOREIGN PATENT DOCUMENTS

| | | | |
|---|---|---|---|
| DE | 019521666 A1 | * | 1/1996 |
| EP | 0100907 | | 2/1984 |
| EP | 0818230 | | 1/1998 |
| WO | 94/06296 | | 3/1994 |

OTHER PUBLICATIONS

Copy of the Search Report.

* cited by examiner

Primary Examiner—David A. Simmons
Assistant Examiner—Frank M. Lawrence
(74) Attorney, Agent, or Firm—Crowell & Moring LLP

(57) ABSTRACT

A filter material having a supporting structure which supports and absorption filter layer, which in turn contains an additive having a biocidal effect.

8 Claims, No Drawings

FILTER MATERIAL USEFUL FOR GAS FILTRATION AND HAVING BIOCIDAL PROPERTIES

CROSS REFERENCE TO RELATED APPLICATIONS

This application is a continuation of international patent application no. PCT/EP00/06382, filed Jul. 6, 2000 designating the United States of America, the entire disclosure of which in incorporated herein by reference. Priority is claimed based on Federal Republic of Germany patent application no. DE 199 31 371.7, filed Jul. 8, 1999.

BACKGROUND OF THE INVENTION

The present invention relates to a filter for gases, particularly air. A filter system of this type, which can be used to eliminate pollutants and odorous substances from airflows, is disclosed in examined European patent application no. EP 100,907 (=DE 32 28 156). The disclosed filters are described as useful for building interiors as well as for the passenger compartments of motor vehicles.

The occupants of vehicles, particularly motor vehicles, are exposed to two influences: pollutants, such as CO, $NO_x$ and, to a lesser degree, $SO_2$, which cannot be smelled or are difficult to smell unless they are present in high concentrations, and odorous substances, which largely consist of incompletely burned fuel, particularly diesel fuel. For the typical motor vehicle user, odorous substances are a considerable nuisance.

Pollutants such as CO and $NO_x$ are difficult to eliminate according to the current state of the art, and their elimination requires bulky filter systems for which there is normally no space available.

Odors cannot be measured; they are a sensation. They are unusual in that they can be sensed even at very small concentrations and if they are disagreeable they are perceived as annoying. By means of tests conducted with a stationary diesel engine it was shown that despite diluting the exhaust 100,000 times with fresh air, a perceptible disagreeable odor persisted. It is therefore not surprising that it takes special filters to keep odors from road traffic from entering the interior of vehicles.

In the prior art, the known filter systems are maintained or serviced by removing dirty particle filters from the filter system and disposing of them. They have to be replaced on the one hand because dust particles accumulate and cake causing increased flow resistance. On the other hand the dust layer contains not only mineral dusts but also biologically active materials (bacteria, fungal spores), which germinate or multiply under suitable temperature and humidity conditions. Microbiological growth can lead to an explosive increase and colonization of the filter media, growth throughout the filter media, odor development, and protein-containing contaminants.

The necessity of servicing filter systems by replacing the particle filters increasingly conflicts with the requirements for a long service life of the filter systems. This applies to the replacement intervals for intake air filtration both in buildings and in vehicles. While the continued development of filter materials has made it possible that particle filtering and gas filtering properties satisfy these requirements over a prolonged period of time, the longterm use of such filter systems is prohibited because of the risk of microbiological contamination.

SUMMARY OF THE INVENTION

Accordingly, it is an object of the invention to provide an improved air filter with biocidal properties.

Another object of the invention is to provide an air filter material which is resistant to microbiological colonization by bacteria, yeasts and molds.

It is also an object of the invention to provide an air filter material which avoids or overcomes the disadvantages described above.

These and other objects have been achieved in accordance with the present invention by providing a filter for gases comprising an air permeable support, an adsorption filter layer and at least one biocidal additive attached to at least one of the support and the adsorption filter layer.

A significant advantage of the invention is that biocidal substances with long-term action can be added to the adsorptive material. Because the biocidal agent is slowly and continuously released, any material in the particle layer capable of germinating is permanently killed and can therefore not trigger any microbiological growth.

In accordance with a further embodiment of the invention, the adsorptive filter layer is comprised of activated carbon or polymer adsorbents, silica gel or zeolite. The adsorptive filter layer, of course, can also be created from a combination of these or other suitable adsorbents. A preferred mixing ratio for the biocidal additive is a proportion of 3% to 30%, preferably 10% of the mass per unit area of the adsorption filter layer. This ensures on the one hand that a high adsorptive volume is available and on the other hand that the biocidal action is sufficient to effectively kill even under unfavorable environmental conditions the spores or living fungi that are capable of germinating. A suitable biocidal additive is iodine or triiodide, which is incorporated in a polymer or an activated carbon adsorbent.

In a further embodiment of the invention, the filter is constructed as a combination filter, i.e., it consists of a supporting layer, a filtration layer, and a filtering cover layer. Several filtration layers can of course also be arranged in succession to achieve a higher degree of filtration.

According to a further embodiment of the invention, the filter material can be a three-dimensional filter structure comprised of an open-cell supporting structure with adsorbents and biocidal agents embedded therein or adhered thereto.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

DETAILED DESCRIPTION OF PREFERRED EMBODIMENTS

The invention will now be described in greater detail. A combination filter material comprising a supporting layer, a filtration layer and a particle layer is disclosed, for instance, in EP 818 230. This material, which contains 440 g/m² activated carbon, was subjected to a durability test. In this test, conducted over a period of 12 months, outside air was continuously conducted at a rate of 150 m³/h of air and the entrained particles and contaminant gases were filtered out.

In the dust layer that formed on the particle filter layer, 85 cfu/cm² (colony-forming units/cm²) of yeasts were found. In a growth promoting environment applied for 48 hours at 23° C., 80% relative humidity, the colony grew to 4000 cfu/cm².

By constructing the described material in such a way that a mixture of 200 g activated carbon and 20 g indirect polymer was incorporated in the second applied layer, a combination filter was produced that is equivalent to the above-described starting material with respect to its particle and gas filtration properties. The indirect polymer was produced as described in U.S. Pat. Nos. 5,639,452; 5,980, 827 and 6,045,820 (=WO 94/06296), the entire disclosures of which are incorporated herein by reference. After the 12-month durability test, only 5 cfu/cm$^2$ yeasts were found. A germination test under the above-described conditions yielded only 10 cfu/cm$^2$ of yeasts after 48 hours.

The foregoing example demonstrates that the biocidally active combination filter material effectively kills spores capable of germinating as well as living fungi.

Activated carbon containing filter materials constructed on a three-dimensional open cell foam structure were used for intake air filtration as early as in 1992. The adsorption filters are typically installed behind a particle filter. The service life can often be as long as 5 years. Due to the residual permeability of the particle filter media for extremely fine particles and microorganisms, the microorganisms are admitted to the adsorptive filter elements over this long service life.

In a filter arrangement of particle and adsorption filters, as described above, 20 colony forming units per cm$^2$ of yeasts were found on the uppermost adsorption layer after a 12-month durability test.

A biocidal filter material was produced by homogeneously mixing 20% of the iodized polymer described in WO 94/06296 with the carbon prior to combining the adsorbents with the foam structure. The mixture was then combined with the foam structure. Such a filter, after being subjected to a durability test, showed only 6 cfu/cm$^2$ filter surface.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A filter for gases comprising an air permeable support, an adsorption filter layer and at least one biocidal additive attached to at least one of the support and the adsorption filter layer, wherein said filter includes a combination filter comprising, in succession, a supporting layer, a filtration layer, and a filtering cover layer, and said filter further includes a filter material having a three-dimensional filter structure comprising an open-cell supporting structure having a homogeneous mixture of adsorbent particles and biocidal particles embedded therein or adhesively bonded thereto.

2. A filter according to claim 1, wherein said filter is an air filter.

3. A filter according to claim 1, wherein the adsorption filter layer comprises at least one adsorbent material selected from the group consisting of activated carbon, polymer adsorbents, silica gels and zeolites.

4. A filter according to claim 1, wherein the adsorption filter layer comprises the biocidal additive in the form of a granular material distributed substantially uniformly across the adsorption filter layer.

5. A filter according to claim 4, wherein said biocidal additive is present in a amount equal to from 3% to 30% of the weight of the adsorption filter layer.

6. A filter according to claim 5, wherein said biocidal additive is present in an amount equal to about 10% of the weight of the adsorption filter layer.

7. A filter according to claim 1, wherein the biocidal additive is a polymer or an activated carbon adsorbent with incorporated iodine or triiodide.

8. A filter according to claim 1, further comprising a mixture of 200 g activated carbon and 20 g indirect polymer.

* * * * *